United States Patent
Kobayashi et al.

(10) Patent No.: US 8,136,843 B2
(45) Date of Patent: Mar. 20, 2012

(54) GAS-ENGINE-MOUNTED WORKING MACHINE

(75) Inventors: Hideaki Kobayashi, Wako (JP); Masayuki Sasaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 519 days.

(21) Appl. No.: 12/274,699

(22) Filed: Nov. 20, 2008

(65) Prior Publication Data

US 2009/0127841 A1    May 21, 2009

(30) Foreign Application Priority Data

Nov. 21, 2007 (JP) ................. 2007-302055

(51) Int. Cl.
*B60P 3/22* (2006.01)
*B60K 15/10* (2006.01)

(52) U.S. Cl. .................... 280/830; 180/69.5

(58) Field of Classification Search ........... 180/69.5, 180/19.1; 248/311.3; 123/179.9; 280/830
See application file for complete search history.

(56) References Cited

U.S. PATENT DOCUMENTS

| | | | |
|---|---|---|---|
| 4,150,456 A * | 4/1979 | Alvarez et al. ............ | 15/49.1 |
| 5,080,414 A * | 1/1992 | Hellquist et al. .......... | 294/31.1 |
| 5,676,117 A * | 10/1997 | Williams ................. | 123/527 |
| 5,799,640 A * | 9/1998 | Sugimoto et al. .......... | 123/527 |
| 5,884,460 A * | 3/1999 | Serravalle et al. ......... | 56/1 |
| 7,448,586 B2 * | 11/2008 | Ziaylek et al. ........... | 248/311.3 |
| 7,878,170 B1 * | 2/2011 | Herzer et al. ............ | 123/195 A |

FOREIGN PATENT DOCUMENTS

| | | | |
|---|---|---|---|
| DE | 102004044259 B3 * | | 1/2006 |
| FR | 2568086 A * | | 1/1986 |
| JP | 62-128932 U | | 8/1987 |
| JP | 64-53426 U | | 4/1989 |
| JP | 04-103864 A | | 4/1992 |
| JP | 07-034980 A | | 2/1995 |
| JP | 10-131809 A | | 5/1998 |
| JP | 11-170876 A | | 6/1999 |
| JP | 2000-274617 A | | 10/2000 |
| JP | 2001-114140 A | | 4/2001 |
| JP | 2006097583 A * | | 4/2006 |
| JP | 2007-056743 A | | 3/2007 |

* cited by examiner

*Primary Examiner* — Joanne Silbermann
*Assistant Examiner* — Daniel Yeagley
(74) *Attorney, Agent, or Firm* — Arent Fox LLP

(57) ABSTRACT

In a gas-engine-mounted working machine, a gas engine is mounted on a machine body and supplied with fuel gas from a cassette gas canister. The cassette gas canister is detachably attached to a gas canister retainer assembly. Handle column extends rearwardly and upwardly from the machine body and having left and right handle posts fixed to the machine body for supporting an operating handle of the machine. The cassette gas canister is mounted, via the gas canister retainer assembly, between the left and right handle posts.

8 Claims, 12 Drawing Sheets

GAS-ENGINE-MOUNTED WORKING MACHINE

CROSS-REFERENCE TO RELATED APPLICATION

This application claims the priority of Japanese Application No. 2007-302055, filed Nov. 21, 2007, the entire specification, claims and drawings of which are incorporated herewith by reference.

FIELD OF THE INVENTION

The present invention relates to gas-engine-mounted working machines including a handle column extending rearwardly and upwardly from the machine body and an operating handle attached to the handle column.

BACKGROUND OF THE INVENTION

Among the conventionally-known working machines are ones which include a gas engine mounted on the machine body, a handle column extending rearwardly and upwardly from the machine body and a storage case (hereinafter referred to as "gas canister cover unit") provided along a handle post, and in which a cassette gas canister is attached to and accommodated in the gas canister cover unit. One example of such working machines is disclosed in Japanese Patent Application Laid-Open Publication No. HEI-10-131809 (JP 10-131809 A).

In the gas-engine-mounted working machine disclosed in the No. HEI-10-131809 publication, the gas engine can be driven by fuel gas supplied from the cassette gas canister to the gas engine. Thus, if the gas-engine-mounted working machine is constructed as a cultivating (tilling) machine, cultivating claws can be rotated so that the machine can travel forward while cultivating the soil by means of the rotating cultivating claws.

Further, in the gas-engine-mounted working machine disclosed in JP 10-131809 A, the gas canister cover unit is fixed to a handle post, and the gas canister is protected by being accommodated in the gas canister cover unit. The gas canister has a great diameter as compared to that of the handle post, and thus, the gas canister cover unit having the gas canister accommodated therein too has a greater width than the handle post. Because the gas canister cover unit having the gas canister accommodated therein is greater in width than the handle post, left and right side wall portions of the gas canister cover unit project laterally leftward and rightward beyond the handle post.

Therefore, during operation of the gas-engine-mounted working machine, ambient obstacles, such as trees or crops, might interfere with left and right walls of the gas canister cover unit. Further, during storage into a given place, the left and right walls of the gas canister cover unit might undesirably contact and be interfered with by ambient obstacles. For these reasons, there is a need to enhance the rigidity of the gas canister cover unit so as to endure the interference from ambient obstacles; however, enhancing the rigidity of the gas canister cover unit would prevent reduction in size and cost of the gas canister cover unit.

SUMMARY OF THE INVENTION

In view of the foregoing prior art problems, it is an object of the present invention to provide an improved gas-engine-mounted working machine which permits reduction in size and cost of the gas canister cover unit, by constructing the gas canister cover unit so that the cover does not have to have a very high rigidity.

In order to accomplish the above-mentioned object, the present invention provides an improved gas-engine-mounted working machine, which comprises: a gas engine mounted on a machine body and supplied with fuel gas from a cassette gas canister; a gas canister retainer assembly including a gas canister cover unit, the cassette gas canister being detachably attached to the gas canister retainer assembly; and a handle column extending rearwardly and upwardly from the machine body and including left and right handle posts fixed to the machine body for supporting an operating handle of the machine. The cassette gas canister is mounted, via the gas canister retainer assembly, between the left and right handle posts.

In the present invention arranged in the aforementioned manner, the left and right handle posts can be spaced from the left and right side surfaces, respectively, of the cassette gas canister. Thus, the cassette gas canister can be protected from ambient objects by the left and right handle posts, so that the gas canister cover unit accommodating the cassette gas canister need not have a very high rigidity. As a result, the gas canister cover unit can be significantly simplified in construction and reduced in size.

In the gas-engine-mounted working machine of the present invention, fuel gas is stored in liquid form in the cassette gas canister, and thus, the cassette gas canister is attached to the gas canister retainer assembly in an upside-down orientation with a gas outlet port of the cassette gas canister oriented downward. Therefore, even when the remaining amount of the liquid fuel gas stored in the cassette gas canister has decreased considerably, the fuel gas can be efficiently led to the outside, e.g. to a nozzle. In this way, the present invention instant embodiment allows the fuel gas to be used up, thereby achieving efficient use of the fuel gas. Normally, the gas canister retainer assembly is located substantially below the waist of a human operator operating the. Thus, the human operator can attach the cassette gas canister, in the upside-down posture or orientation, to the gas canister retainer assembly by just pushing the gas canister into the retainer assembly. Further, when the cassette gas canister is to be detached from the gas canister retainer assembly, the human operator only has to pull the cassette gas canister upward. Therefore, the present invention can facilitate the attachment and detachment of the cassette gas canister to and from the gas canister retainer assembly.

Preferably, the cassette gas canister has a lead tube of a generally L shape provided therein for leading the fuel gas to the gas outlet port, and the gas canister retainer assembly includes a positioning member for, when the cassette gas canister is to be attached to the gas canister retainer assembly, positioning the cassette gas canister in such a manner that an inlet portion of the lead tube, provided for leading the fuel gas into the lead tube, is located close to a lowermost interior region of the cassette gas canister attached to the gas canister retainer assembly in the upside-down orientation. Therefore, even when the remaining amount of the liquid fuel gas stored in the cassette gas canister has decreased considerably, the fuel gas can be efficiently led to the outside, e.g. to the nozzle. In this way, the present invention instant embodiment allows the fuel gas to be used up even more efficiently.

Preferably, the positioning member comprises a leaf spring. Thus, the positioning member in the present invention can be of a simplified construction, which can thereby greatly facilitate assemblage or attachment of the cassette gas canister to the gas canister retainer assembly. Upon completion of the assemblage or attachment of the cassette gas canister to the gas canister retainer assembly, the leaf spring comes back to its original shape to engage with the cassette gas canister. In this way, the human operator can confirm that the cassette gas canister has been appropriately positioned in its predetermined attached position, through an abutting sound produced, or an abutting feel transmitted to a hand of the human operator, when the leaf spring has appropriately engaged with the cassette gas canister.

Preferably, the cassette gas canister has a substantial lower half portion covered with the gas canister cover unit of the retainer assembly. Thus, a substantial upper half portion of the gas canister is allowed to project upward beyond the cover unit, so that the present invention not only can even further facilitate the attachment and detachment of the cassette gas canister, but also allows the human operator to confirm at a glance whether the cassette gas canister is currently attached to the gas canister retainer assembly.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

In the following description, the terms "front", "rear", "left" and "right" are used to refer to directions as viewed from a human operator. Whereas a walk-behind cultivating machine will hereinafter be described as a preferred embodiment of a gas-engine-mounted working machine of the present invention, the present invention is not limited to such a walk-behind cultivating machine.

Figure 1:
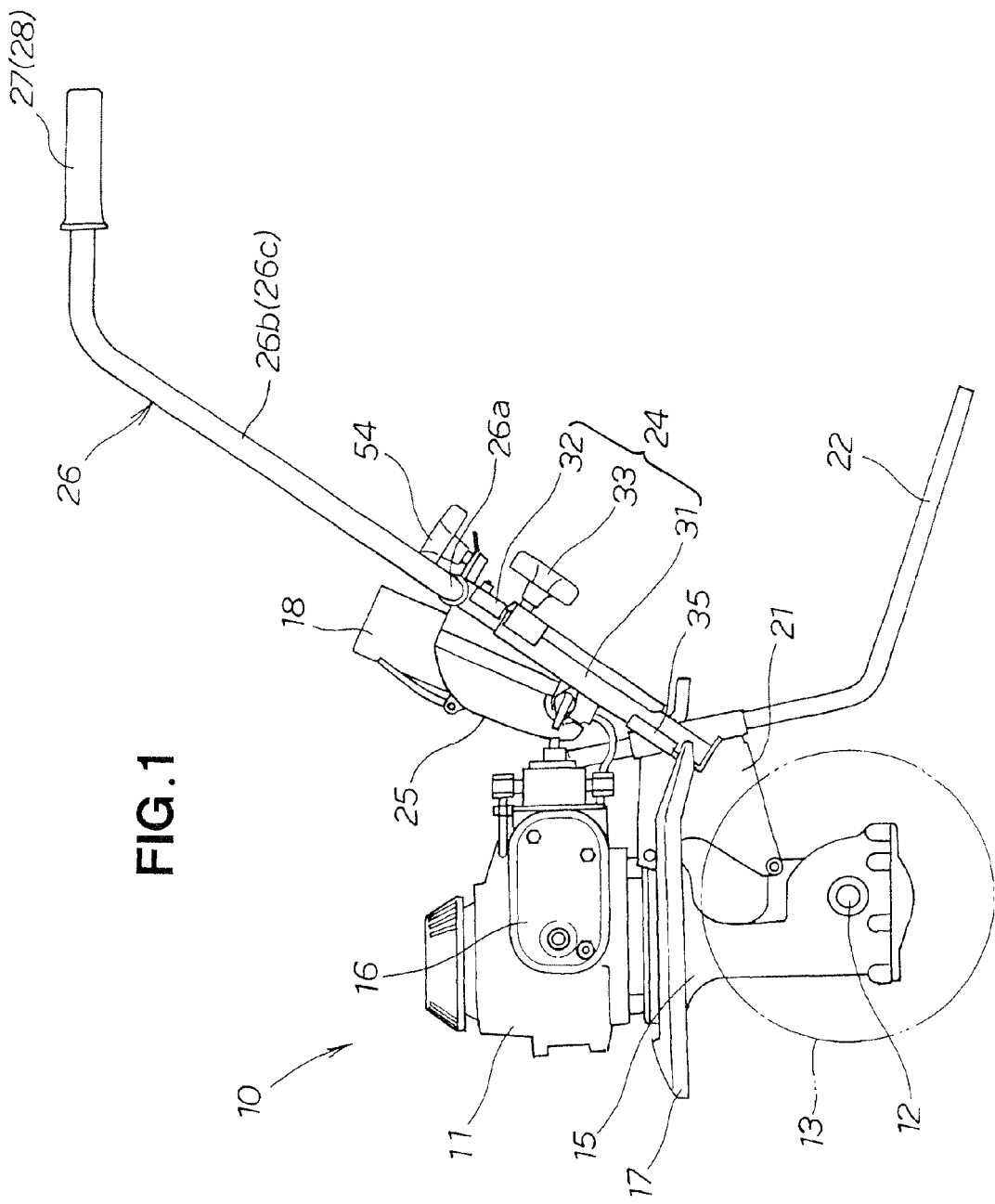
FIG. 1 is a side view showing an embodiment of a gas-engine-mounted working machine of the present invention.

FIG. 1 is a side view according to an embodiment of the gas-engine-mounted working machine 10 of the present invention. The gas-engine-mounted working machine 10 illustrated here is a walk-behind cultivating machine where driving power of a gas engine 11 is transmitted to a cultivating shaft 12 to rotate the cultivating shaft 12 so that it can travel while cultivating the soil by means of a plurality of cultivating claws 13.

The gas-engine-mounted working machine 10 includes a gas engine 11 mounted on an upper end portion of a machine body 15, a fender 17 disposed beneath the gas engine 11 and muffler 16 disposed to the left of the gas engine 11, and the plurality of cultivating claws 13 disposed beneath the fender 17.

The cultivating shaft 12 is a rotation shaft extending horizontally in a width direction of the machine body. The fender 17 is a cover for preventing dispersion of the soil. The gas engine 11 is driven by fuel gas (fuel) 85 (see FIG. 8) supplied from a later-described cassette gas canister 18.

The gas-engine-mounted working machine 10 further includes a support bracket 21 fixed to the machine body 15, a resistance bar 22 fixed to the support bracket 21, a handle column 24 extending rearwardly and upwardly from the support bracket 21, a gas canister retainer assembly (gas canister retainer means) 25 fixed to the handle column 24, the gas canister 18 mounted to the gas canister retainer assembly 25, and an operating handle 26 mounted to an upper end portion of the handle column 24. The resistance bar 22 is a member for adjusting a soil cultivating depth of the plurality of cultivating claws 13.

Figure 2:
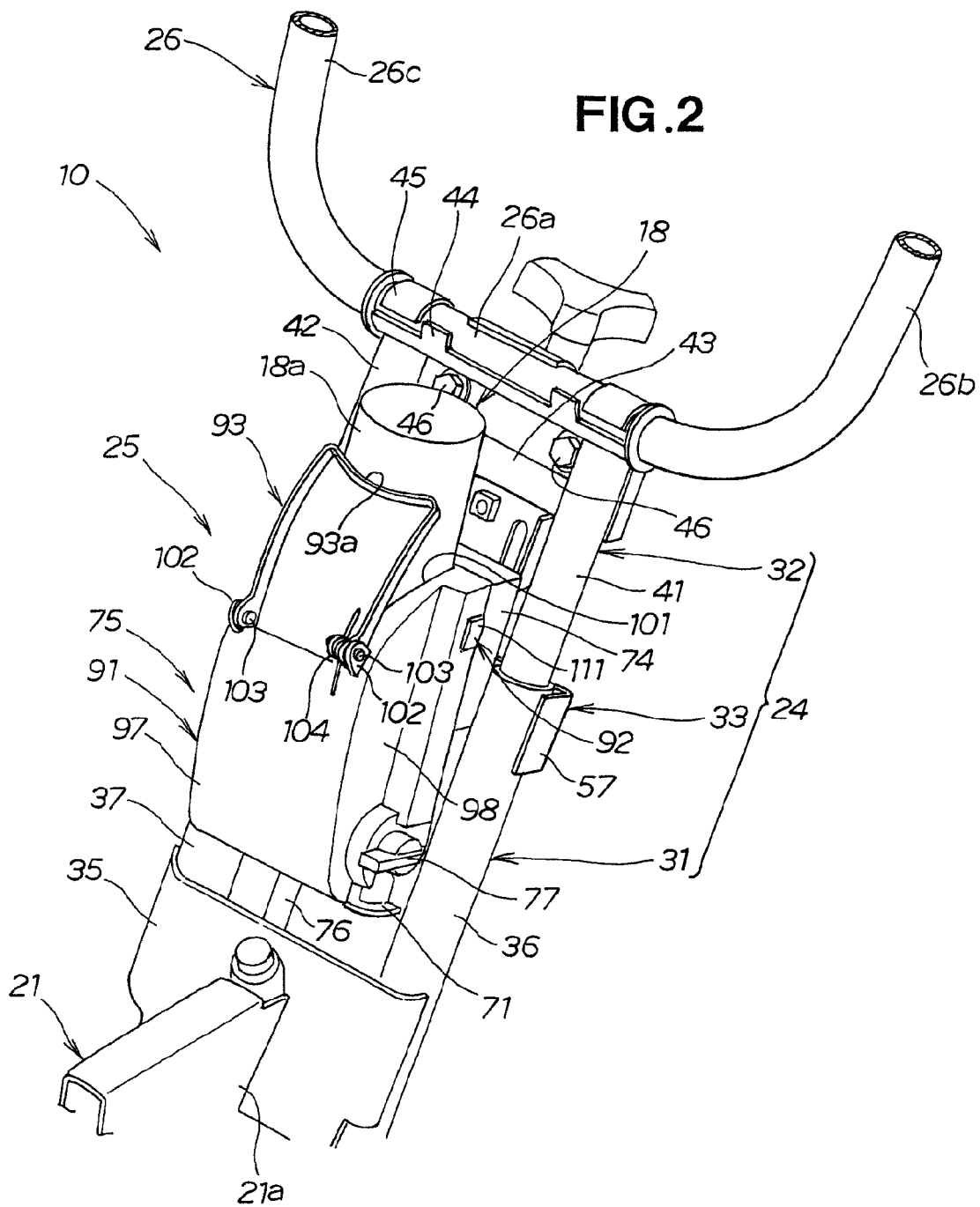
FIG. 2 is a perspective view of the gas-engine-mounted working machine of the present invention, which particularly shows a cassette gas canister attached to a gas canister retainer assembly of the working machine.

The operating handle 26 is a cylindrical member that has a substantially U overall shape as viewed from the front (see FIG. 2). The operating handle 26 has a horizontal intermediate section 26a pivotably mounted to the upper end portion of the handle column 24, left and right handle sections 26b and 26c extending rearwardly and upwardly from the left and right ends, respectively, of the horizontal intermediate section 26a, and left and right grips 27 and 28 provided on respective distal end portions of the left and right handle sections 26b and 26c.

Figure 3:
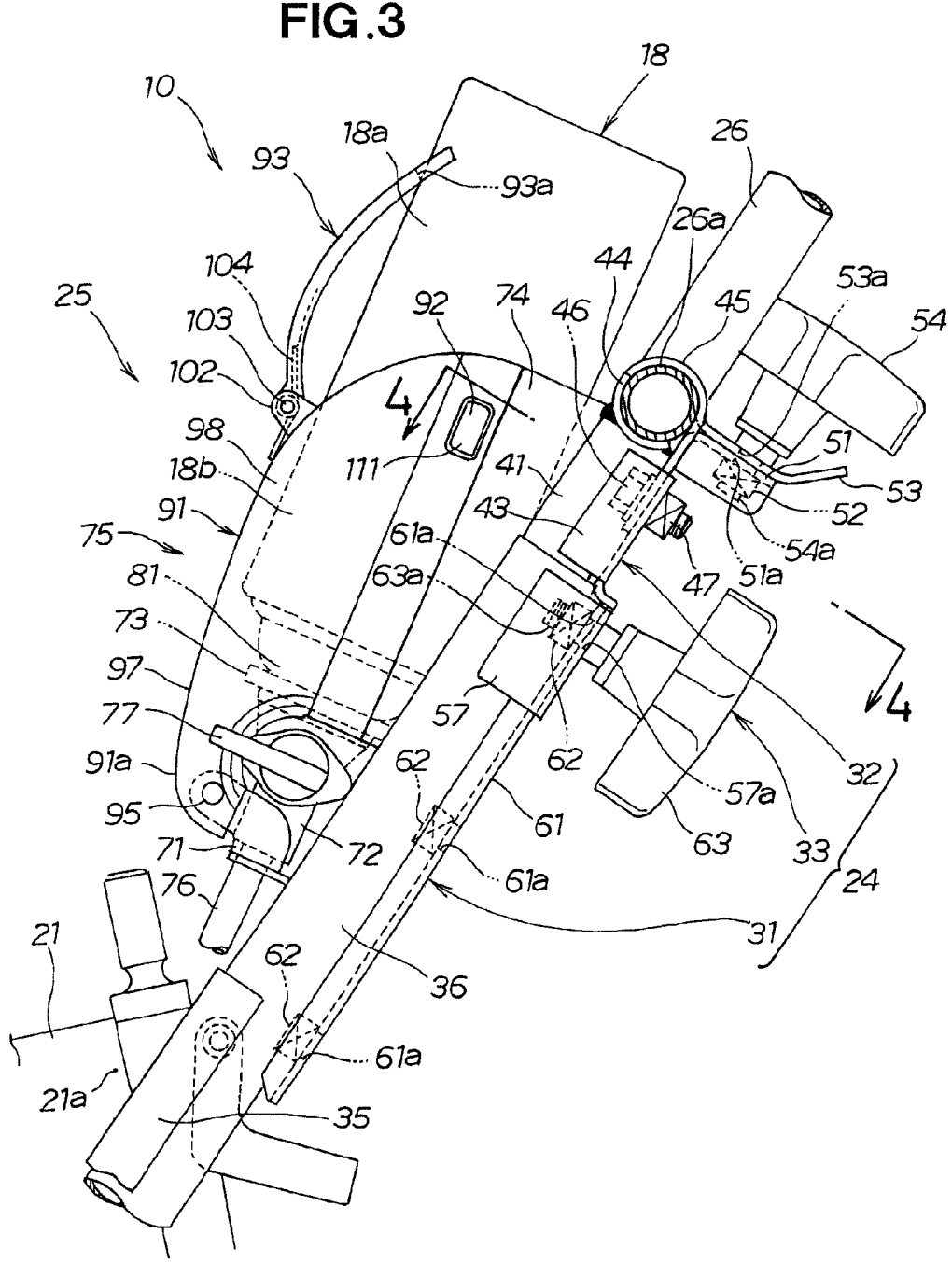
FIG. 3 is a side view of the gas-engine-mounted working machine of the present invention.
Figure 4:
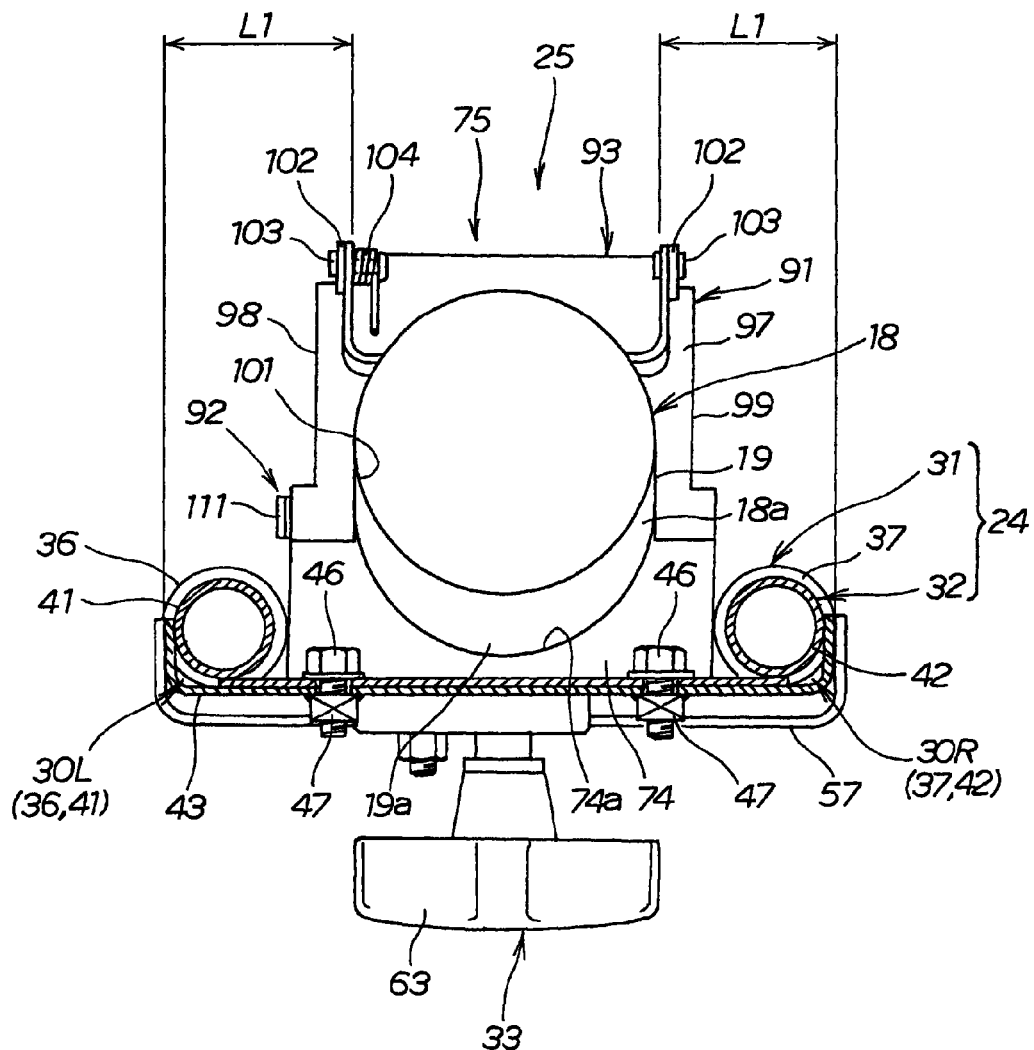
FIG. 4 is a sectional view taken along line 4-4 of FIG. 3.

FIG. 2 is a perspective view of the gas-engine-mounted working machine 10, which particularly shows the cassette gas canister 18 attached to and accommodated in a gas canister cover unit of the machine. FIG. 3 is a side view of the gas-engine-mounted working machine 10 which particularly shows the cassette gas canister 18, and FIG. 4 is a sectional view taken along the 4-4 line of FIG. 3.

More specifically, FIG. 2 shows the operating handle 26 held at its uppermost position with a liftable (i.e., vertically expandable/contractable) column 32 of the handle column 24 expanded upward, and FIG. 3 shows the operating handle 26 held at its lowermost position with the liftable column 32 contracted.

The handle column 24 further includes a fixed column 31 fixed to a rear end portion 21a of the support bracket 21 and having the liftable column 32 vertically movably mounted thereto, and a retainer 33 for retaining the liftable column 32 at a desired position.

The fixed column 31 includes a column retaining bracket 35 (see also FIG. 1) fixed to the rear end portion 21a of the support bracket 21, and left and right fixed post sections 36 and 37 fixed to left and right end portions of the column retaining bracket 35.

The left and right fixed post sections 36 and 37 are spaced from each other by a predetermined distance and have their respective lower end portions welded to the column retaining bracket 35. The left and right fixed post sections 36 and 37, each of which is in the form of a cylindrical pipe member, are disposed in left-right symmetric relation to each other with respect to the column retaining bracket 35, and the liftable column 32 is inserted in the left and right fixed post sections 36 and 37 in such a manner that it is vertically movable along the fixed post sections 36 and 37.

More specifically, the liftable column 32 has left and right liftable post sections 41 and 42 vertically movably inserted in (i.e. telescopically mounted to) the left and right fixed post sections 36 and 37, respectively, an liftable post connecting section 43 interconnecting respective upper end portions of the left and right liftable post sections 41 and 42, a handle support section 44 fixed to and spanning between the respective upper ends of the left and right liftable post sections 41 and 42, and a handle retaining member 45 that retains the operating handle 26 supported on the handle support section 44.

The left fixed post section 36 and left liftable post section 41 together constitute a left handle post 30L, while the right fixed post section 37 and right liftable post section 42 together constitute a right handle post 30R. The left and right liftable post sections 41 and 42, each of which is in the form of a cylindrical pipe member, are disposed in left-right symmetric relation to each other.

The horizontal intermediate section 26a of the operating handle 26 is placed on the handle support section 44 and retained by the handle retaining member 45 from above. The handle retaining member 45 is fixed to the liftable post connecting section 43 by means of bolts 46 and nuts 47. In this manner, the horizontal intermediate section 26a of the operating handle 26 is pivotably supported by the handle support section 44 and handle retaining member 45.

As shown in FIG. 3, the handle retaining member 45 has a locking plate section 51 formed thereon and extending in the width direction of the machine 10 between the left and right liftable post sections 41 and 42. The locking plate section 51 has a first locking hole 51a formed therein, and a locking nut 52 is disposed coaxially with the first locking hole 51a and welded to the underside surface of the locking plate section 51.

The horizontal intermediate section 26a of the operating handle 26 has a locking projection 53 that projects rearwardly in superposed relation to the locking plate section 51, and a second locking hole 53a is formed in the locking projection 53.

The locking projection 53 is superposed on the locking plate section 51, and a locking screw 54 is inserted through the second and first locking holes 53a and 51a. Threaded portion 54a of the locking screw 54, projecting downwardly out of the first locking hole 51a, is screwed to the locking nut 52, so that the operating handle 26 is retained in its use position.

The liftable column 32 is retained at a predetermined height position by the retainer 33. The retainer 33 has a fixed post connecting section 57 interconnecting respective upper end portions of the left and right fixed post sections 36 and 37, a first retaining hole 57a formed in a substantial middle region of the fixed post connecting section 57, a slide plate 61 extending downward from the liftable post connecting section 43, and a plurality of second retaining holes 61a formed in the slide plate 61 at predetermined vertical intervals. A plurality of retaining nuts 62 are disposed coaxially with the respective second retaining holes 61a and welded to the underside surface of the slide plate 61. As an example, the second retaining holes 61a are formed in three positions, e.g. upper, middle and lower positions, of the slide plate 61.

By the liftable column 32 being retained at its lowermost position, as shown in FIG. 3, the operating handle 26 is retained at its lowermost position with the second retaining hole 61a, formed in the upper position of the slide plate 61, is aligned coaxially with the first retaining hole 57a of the retainer 33.

Retaining screw 63 is inserted through the coaxially-aligned first retaining hole 57a and second retaining hole 61a, and a threaded portion 63a of the retaining screw 63, projecting out of from the second retaining hole 61a, is screwed to the retaining nut 62, so that the liftable column 32 (and hence the operating handle 26) is retained at the lowermost position.

By the liftable column 32 being raised to its middle position, the second retaining hole 61a, formed in the middle position of the slide plate 61, is aligned coaxially with the first retaining hole 57a of the retainer 33. Thus, the liftable column 32 (and hence the operating handle 26) is retained at its middle position higher than the lowermost position by means of the retaining screw 63 and retaining nut 62.

Further, by the liftable column 32 being raised to its uppermost position, the second retaining hole 61a, formed in the lower position of the slide plate 61, is aligned coaxially with the first retaining hole 57a of the retainer 33. Thus, the liftable column 32 (and hence the operating handle 26) is retained at its uppermost position by means of the retaining screw 63 and retaining nut 62, as shown in FIG. 2.

The gas canister retainer assembly 25 is fixed to the handle column 24. The gas canister retainer assembly 25 includes an adaptor bracket 71 (see also FIG. 6) disposed between the left and right fixed post sections 36 and 37, an opening/closing valve 72 (see also FIG. 6) provided on the adaptor bracket 71, an adaptor unit 73 connected to the opening/closing valve 72, a gas canister holder 74 disposed above the adaptor unit 73, and the gas canister cover unit 75 openably and closably mounted to the adaptor bracket 71.

The opening/closing valve 72 has a supply port (not shown) formed in its lower portion communicating with a fuel passage 76 for leading liquid fuel gas 85 (see FIG. 8), and a switching knob 77 is attached to a left side portion of the valve 72.

The adaptor unit 73 is a member to which a nozzle-side end portion 81 of the cassette gas canister 18 is to be operatively connected or attached, and the adaptor unit 73 is disposed in a substantial middle region between the left and right fixed post sections 36 and 37. Details of the adaptor unit 73 will be discussed later with reference to FIGS. 6 and 7.

As shown in FIG. 4, the gas canister holder 74 is disposed between the left and right fixed post sections 36 and 37 and has an arcuately-curved recessed portion 74a facing, and corresponding in shape to, a rear wall portion of the cassette gas canister 18 so that the rear wall portion of the cassette gas canister 18 is supported by the arcuately-curved recessed portion 74a.

The gas canister cover unit 75 is disposed between and extends along the left and right handle posts 30L and 30R, so as to not only cover a substantial lower half portion 18b (see FIG. 3) of the cassette gas canister 18 but also support the cassette gas canister 18.

The gas canister cover unit 75 includes a main cover member 91 openably and closably supported on the adaptor bracket 71, a lock mechanism 92 for locking the main cover member 91 in a closed position, a sub cover member 93 openably and closably supported on an upper end portion of the main cover member 91.

The main cover member 91 is disposed in a position opposed to the gas canister holder 74, and it is pivotably supported at a lower end section 91a thereof by the adaptor bracket 71 by means of left and right support pins 95. The main cover member 91 has a front wall section 97 and left and right side wall sections 98 and 99.

As shown in FIG. 2, the front wall section 97 has a lower half portion of a substantially flat plate shape, a bent portion bent rearward from the lower end of the lower half portion, and an upper half portion curved rearward from the upper end of the lower half portion.

Opening portion 101 is formed in the upper half portion of the front wall section 97, and left and right supporting protrusions 102, projecting laterally outward, are formed on the upper half portion near the opening portion 101. The opening portion 101 is formed to allow a substantial upper half portion 18a of the cassette gas canister 18 to project upward.

The sub cover member 93 is pivotably supported by the left and right supporting protrusions 102 via left and right support pins 103. The sub cover member 93 is normally biased or urged, by means of coil springs 104 mounted on the left and right support pins 103, in a direction to close the opening portion 101 of the front wall section 97.

As shown in FIG. 2, the sub cover member 93 has an upper end portion 93a arcuately curved so as to contact the substantial upper half portion 18a of the cassette gas canister 18 over a considerably wide area. Thus, the entire upper end portion 93a can pressingly hold the cassette gas canister 18 by use of the biasing force of the coil springs 104. In this way, it is possible to effectively prevent vibrations of the cassette gas canister 18 that may occur during operation of the gas-engine-mounted working machine 10.

Figure 5:
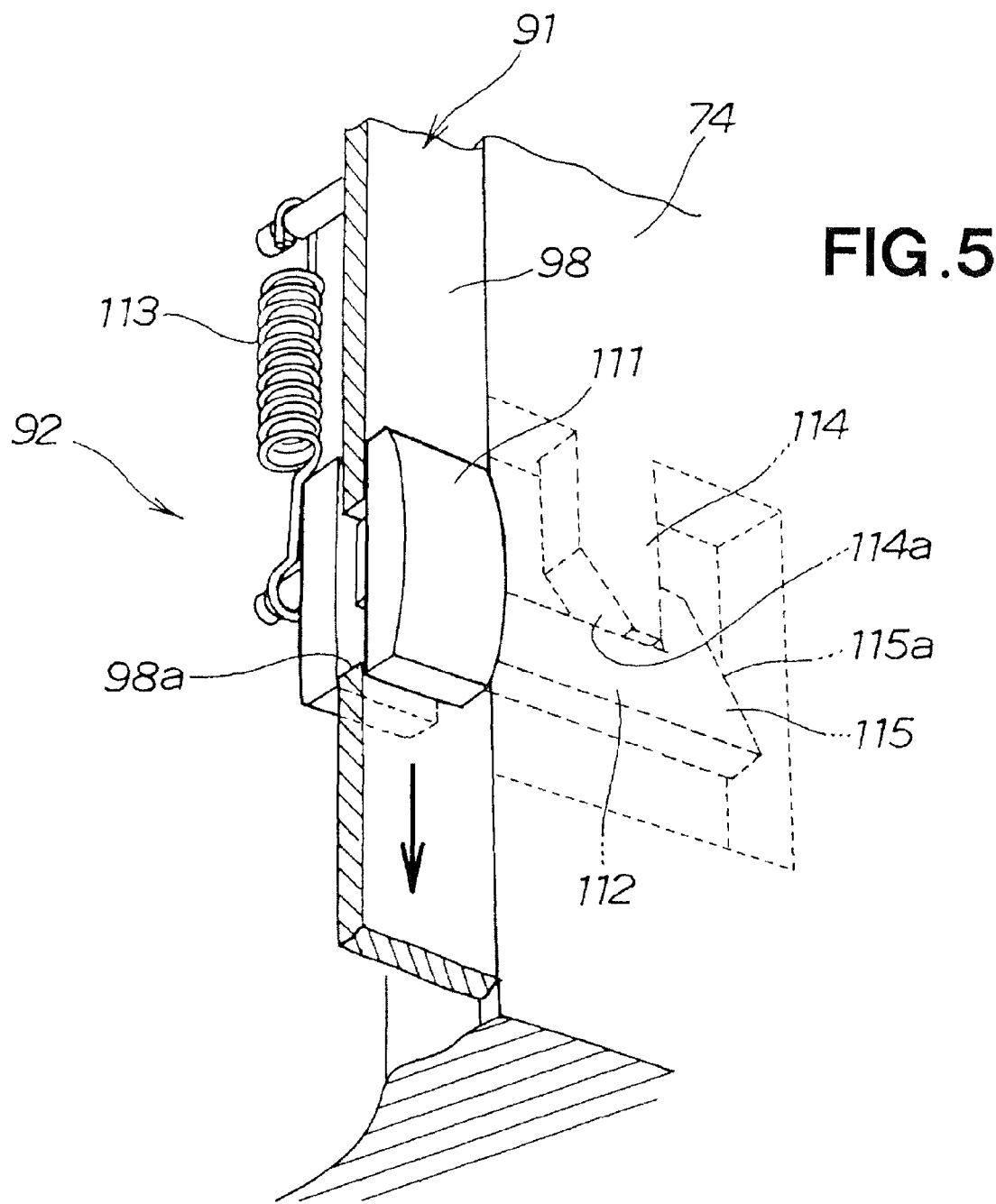
FIG. 5 is a perspective view of a lock mechanism of a gas canister cover unit in the gas-engine-mounted working machine of the present invention.

FIG. 5 is a perspective view of the lock mechanism 92 of the gas canister cover unit 75. The lock mechanism 92 includes a slide knob 111 slidably mounted in a slide opening 98a of the left wall portion 98, an engaging lever 112 extending rearward from the slide knob 111, a tension spring 113 for retaining the slide knob 111 in an engaging position, and an engaging block 114 provided on the gas canister holder 74.

By retaining the slide knob 111 in the locking position by the biasing force of the tension spring 113, an engaging claw 115 of the engaging lever 112 is kept engaging with the engaging block 114. Thus, the lock mechanism 92 is kept in its locking position so that the main cover member 91 can be kept closed.

As the slide knob 111 is moved downward as indicated by an arrow against the biasing force of the tension spring 113 in the aforementioned condition, the engaging claw 115 is disengaged from the engaging block 114. Thus, the locking state of the lock mechanism 92 is canceled, so that the main cover member 91 can be opened.

When closing the main cover member 91 from the opened position, a slanting surface 115a of the engaging claw 115 first abuts against a slanting surface 114a of the engaging block 114, so that the locking claw 15 is pressed in an arrowed direction by the slanting surface 114a of the engaging block 114. Thus, the engaging lever 112 moves in the engaging lever 112 against the biasing force of the tension spring 113.

Then, as the main cover 91 reaches its closed position, the engaging claw 115 gets over the slanting surface 114a of the engaging block 114. Thus, the engaging lever 112 moves back to a locking position by the biasing force of the tension spring 113, so that the engaging claw 115 of the engaging lever 112 is kept in engagement with the engaging block 114.

In the aforementioned manner, the lock mechanism 92 can be retained in the locking position to thereby retain the main cover member 91 in the closed position.

Note that, by closing the main cover 91 in the aforementioned manner, the opening portion 101 (see FIG. 2) of the main cover member 91 can be abutted against a container 19 of the cassette gas canister 18.

Figure 6:
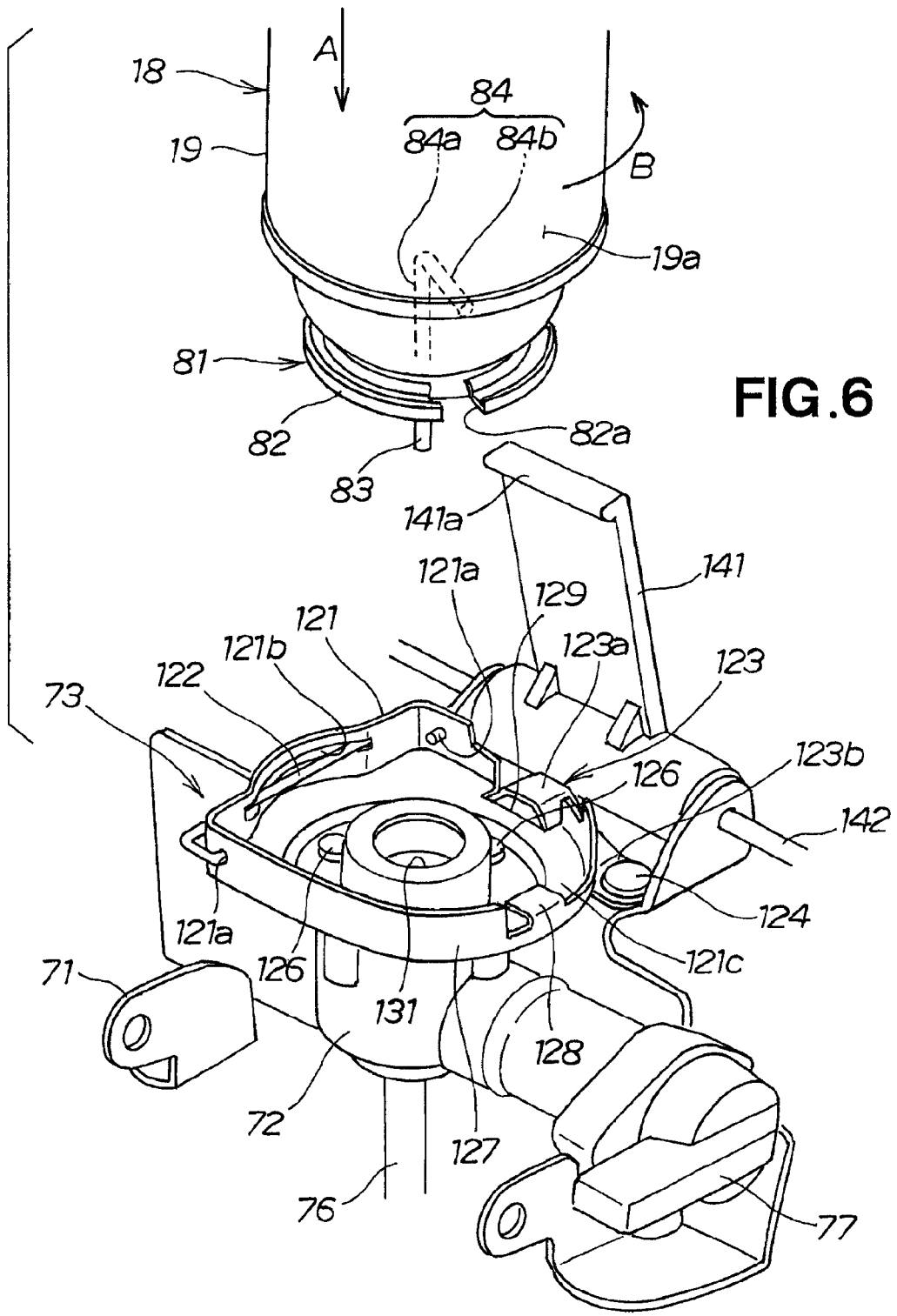
FIG. 6 is a perspective view showing the gas-engine-mounted working machine before the cassette gas canister is attached to the gas canister retainer assembly.
Figure 7:
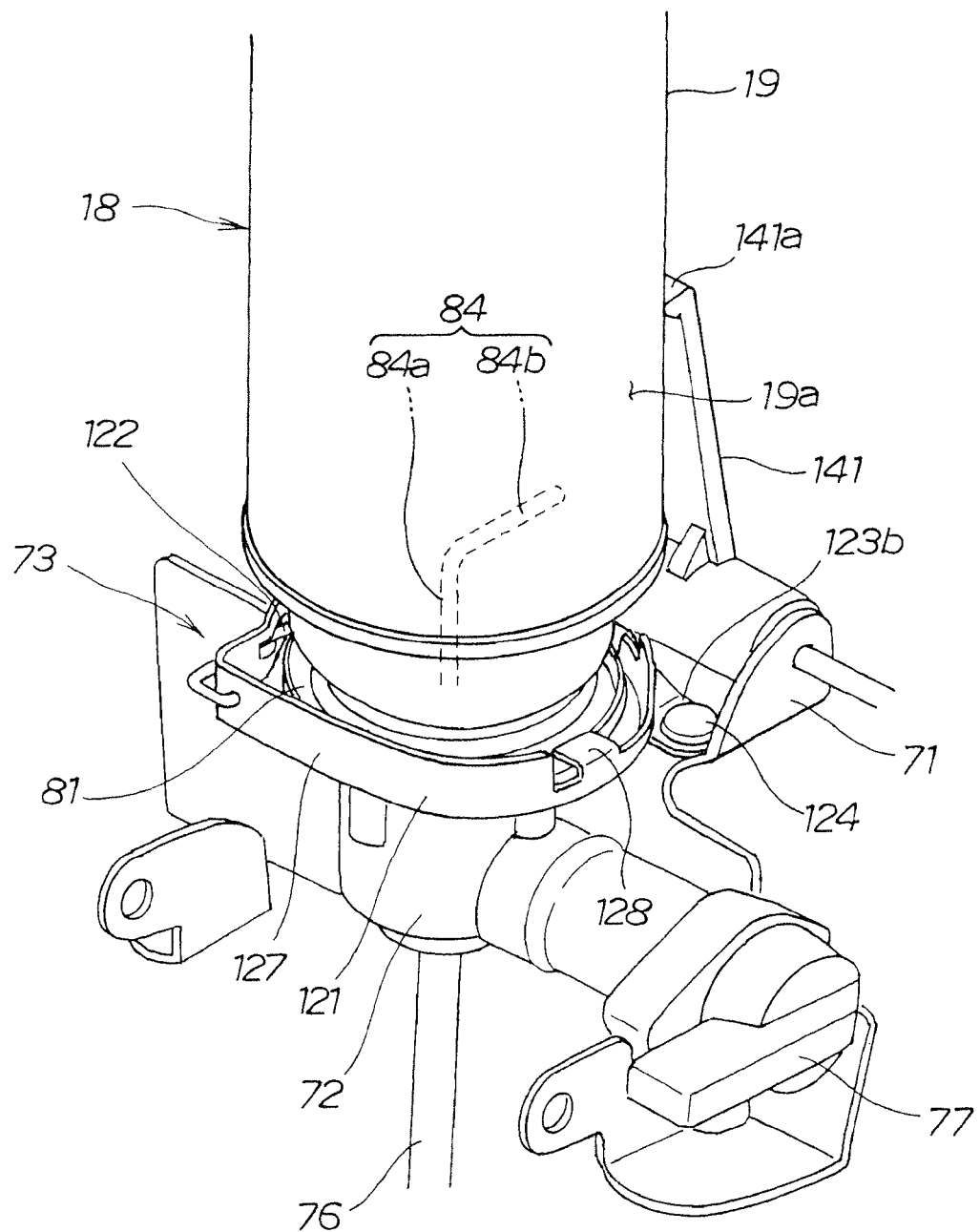
FIG. 7 is a perspective view showing the cassette gas canister duly attached to the gas canister retainer assembly.

FIG. 6 is a perspective view showing the gas canister retainer assembly 25 before attachment thereto of the cassette gas canister 18, FIG. 7 is a perspective view showing the cassette gas canister 18 attached to, retained by and accommodated in the gas canister retainer assembly.

The adaptor unit 73 of the gas canister retainer assembly 25 includes an adaptor 121 for attachment thereto of the nozzle-side end portion 81 of the cassette gas canister 18, an engaging pin 122 provided on the adaptor 121, and a leaf spring (positioning means) 123 for appropriately positioning the cassette gas canister 18.

Figure 8:
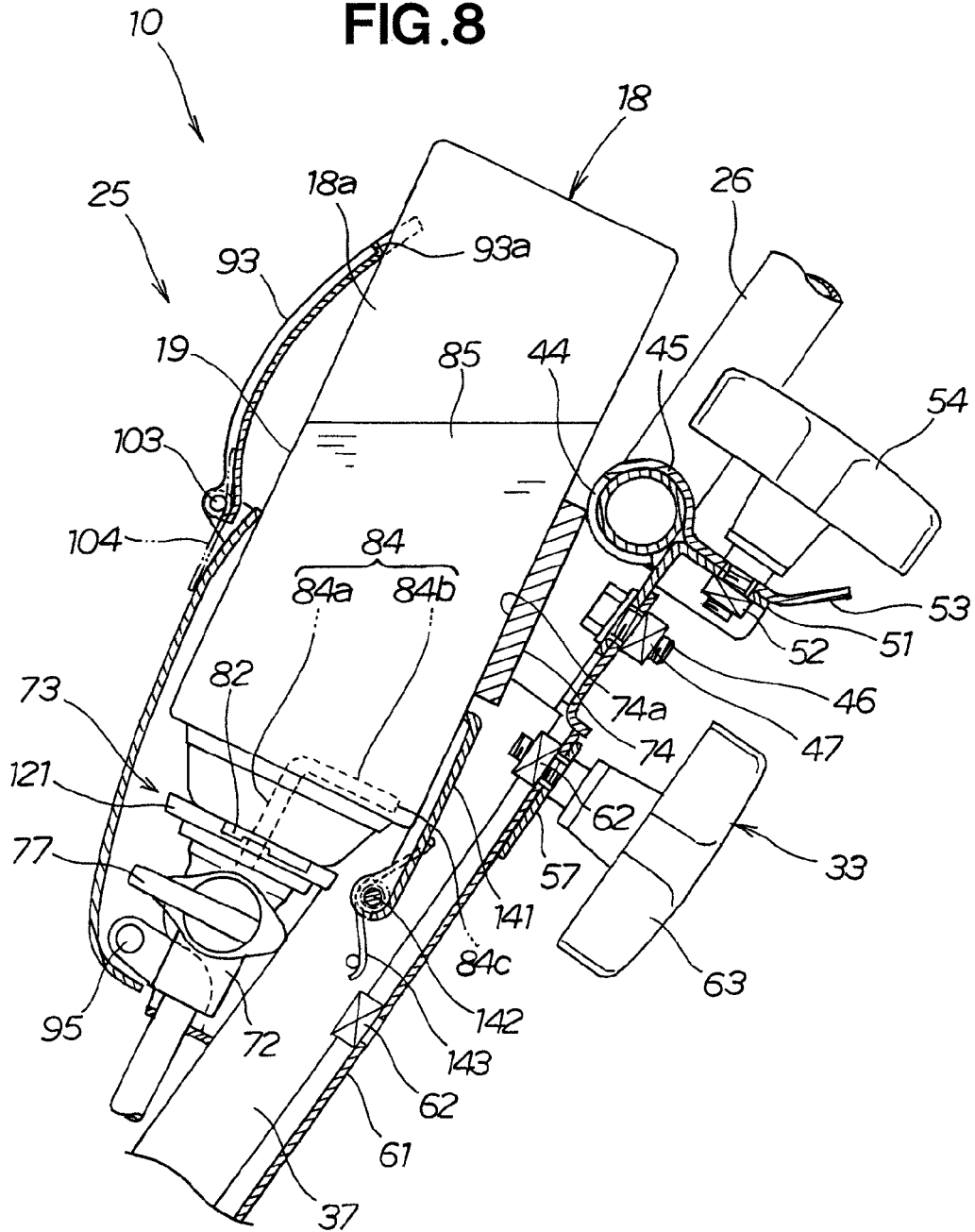
FIG. 8 is a sectional view showing the cassette gas canister attached to the gas canister retainer assembly.

The adaptor 121 is fixed to an upper end portion of the opening/closing valve 72, by means of bolts 126, with a rearward and downward inclination as shown in FIG. 8.

The adaptor 121 has an outer peripheral wall 127, and the outer peripheral wall 127 has a pair of mounting holes 121a mounting therein opposite end portions of the engaging pin 122 and an elongated hole 121b retaining the engaging pin 122 at a predetermined height. The adaptor 121 also has a radially-inwardly-bent engaging piece 128 formed in a position thereof opposed to the elongated hole 121b, and a recessed portion 129 formed in a position thereof opposed to and angularly displaced from the bent engaging piece 128 by about 90 degrees. The adaptor 121 also has a central nozzle receiving opening 131.

The recessed portion 129 is formed in such a manner as to receive therein a middle upwardly-bulging portion 123a of the leaf spring 123 so that the bulging portion 123a projects upward from the recessed portion 129 above a bottom 121c of the adaptor 121. The nozzle receiving opening 131 is formed to receive therein a nozzle (outlet port) 83 of the cassette gas canister 18.

The leaf spring 123 is fixed at its left end portion, located to the left of the middle upwardly-bulging portion 123a, to the adaptor bracket 71 by means of a rivet 124; a right end portion (not shown) of the leaf spring 123 is a free end portion that is not fixed to anything. With the upwardly-bulging portion 123a projecting above the bottom 121c of the adaptor 121, the cassette gas canister 18 can be appropriately positioned.

Namely, in the instant embodiment, the positioning means for appropriately positioning the cassette gas canister 18 comprises the cantilevered leaf spring 123. Thus, the positioning means in the instant embodiment can be of a simplified construction, which can thereby greatly facilitate assemblage or attachment of the cassette gas canister 18 to the gas canister retainer assembly 25.

Upon completion of the assemblage or attachment of the cassette gas canister 18 to the gas canister retainer assembly 25, the leaf spring 123 comes back to its original shape to engage in a recessed portion 82a of the cassette gas canister 18. In this way, the human operator (not shown) can confirm that the cassette gas canister 18 has been appropriately positioned in its predetermined attached position, through an abutting sound produced, or an abutting feel transmitted to a hand of the human operator, when the leaf spring 123 has appropriately engaged with the cassette gas canister 18.

Further, as a downward pressing force acts on the upwardly-bulging portion 123a of the leaf spring 123, the upwardly-bulging portion 123a is depressed downward with the not-shown right end portion (i.e., free end portion) displaced downward.

In the instant embodiment, the cassette gas canister 18 is a commercially-available gas canister where the liquid fuel gas 85, preferably liquefied butane consisting primarily of butane, is filled in the container 19.

As illustrated in FIG. 6, the cassette gas canister 18 has a flange 82 formed on the nozzle-side end portion 81 of the container 19, and the flange 82 has the recessed portion 82a. Nozzle 83 projects downward beyond the nozzle-side end portion 81, and a feed tube 84 of a generally L shape is provided in the container 19.

With the nozzle 83 pressed into the container 19, the liquid fuel gas 85 stored in the container 19 can be lead via the feed tube 84 to the nozzle 83, from which the gas 85 can be fed to the outside.

The feed tube 84, which is formed in a generally L shape, has a vertical tube portion 84a extending coaxially with the nozzle 83 and a horizontal tube portion 84b extending from the upper end of the vertical tube portion 84a, in a direction substantially perpendicular to the vertical tube portion 84a, close to the lowermost end of a peripheral wall 19a, as shown in FIG. 6. Inlet portion 84c (see FIG. 8) located at the distal end of the horizontal tube portion 84b is located near the lowermost end of the peripheral wall 19a.

In attaching the cassette gas canister 18 to the gas canister retainer assembly 25, the nozzle 83 is positioned in vertical alignment with the nozzle receiving opening 131 with the cassette gas canister 18 oriented in an upside-down posture with the gas outlet port 83 of the cassette gas canister oriented downward, and also the bent engaging piece 128 is positioned in vertical alignment with the recessed portion 82a. Then, the cassette gas canister 18 is moved downward as indicated by arrow A, so that a right side portion of the flange 82 is inserted between the bottom 121c of the adaptor 121 and the engaging pin 122 with the recessed portion 82a moving past the radially-inwardly-bent engaging portion 128 without being interfered with the engaging portion 128. As a consequence, a left side portion of the flange 82 can be positioned below the radially-inwardly-bent engaging portion 128 so that the nozzle-side end portion 81 (more specifically, flange 82) is abutted against the bottom 121c of the adaptor 121.

By the nozzle-side end portion 81 being abutted against the bottom 121c of the adaptor 121, the upwardly-bulging portion 123a of the leaf spring 123 is depressed to the bottom 121c by the flange 82.

Then, as the cassette gas canister 18 is pivoted in a counter-clockwise direction of FIG. 6 as indicated by arrow B, the recessed portion 82a is displaced out of the vertical alignment with the radially-inwardly-bent engaging portion 128, so that the left side portion of the flange 82 is sandwiched between the bottom 121c and the bent engaging portion 128. Thus, the right side portion of the flange 82 is sandwiched between the bottom 121c and the engaging pin 122, while the left side portion of the flange 82 is sandwiched between the bottom 121c and the bent engaging portion 128.

Then, as the cassette gas canister 18 is further pivoted through about 90 degrees in the counterclockwise direction, the recessed portion 82a moves to the upwardly-bulging portion 123a of the leaf spring 123. Thus, the depressing force applied from the flange 82 to the upwardly-bulging portion 123a is canceled, so that the bulging portion 123a comes to engage in the recessed portion 82a. In the aforementioned manner, the cassette gas canister 18 can be attached to the adaptor 121 with its position appropriately determined by the leaf spring 123.

By mounting the nozzle-side end portion 81 to the adaptor 121 of the gas canister retainer assembly 25, the cassette gas canister 18 can be attached to the adaptor 121 with the nozzle (gas outlet port) 83 appropriately positioned in the downward orientation, as shown in FIG. 7. By mounting the nozzle-side end portion 81 to the adaptor 121 in the aforementioned manner, the cassette gas canister 18 can be appropriately positioned substantially centrally between the left and right fixed post sections 36 and 37, as shown in FIG. 4.

Further, by mounting the nozzle-side end portion 81 to the adaptor 121 of the gas canister retainer assembly 25, the nozzle 83 is pressed into the container 19 so that the interior of the container 19 is placed in fluid communication with the opening/closing valve 72. Thus, by the human operator operating the switching knob 77, the liquid fuel gas 85 stored in the container 19 of the cassette gas canister 18 is led to a vaporizer (not shown) via the fuel passage 76. Then, the liquid fuel gas 85 is vaporized by the vaporizer, and the thus-vaporized liquid fuel gas 85 is mixed with air and then supplied to the gas engine 11 (see FIG. 1).

As shown in FIG. 6, a shutter member 141 is pivotably supported on the adaptor bracket 71 via a support shaft 142. The support shaft 142 is connected at its left and right ends to the left and right fixed post sections 36 and 37.

The adaptor bracket 71 has a portion supporting the opening/closing valve 72, a portion pivotably supporting the main cover member 91 via the left and right pins 95, a portion supporting the leaf spring 123, and a portion pivotably supporting the shutter member 141 via the support shaft 142.

The shutter member 141 supported by the adaptor bracket 71 is normally urged by a coil spring 143 (FIG. 8) in a direction to close the nozzle receiving opening 131. Thus, when the adaptor unit 73 is detached from the adaptor unit 73, the nozzle receiving opening 131 is kept closed with the shutter member 141.

To facilitate understanding of the construction of the adaptor unit 73, FIG. 6 shows the nozzle receiving opening 131 as being opened with the shutter member 141 placed in an opening position.

Further, with the cassette gas canister 18 attached to the adaptor unit 73, as shown in FIG. 7, a distal end portion 141a of the shutter member 141 can be kept abutted against the container 19 of the gas canister 18.

As described above, the gas canister retainer assembly 25 in the instant embodiment allows the cassette gas canister 18 to be attached thereto with the nozzle 83 oriented downward. Thus, even when the remaining amount of the liquid fuel gas 85 stored in the container 19 has decreased considerably, the fuel gas 85 can be efficiently led to the nozzle 83. In this way, the instant embodiment allows the fuel gas 85 to be used up, thereby achieving efficient use of the fuel gas 85.

Further, as shown in FIG. 4, the cassette gas canister 18 supported by the gas canister cover unit 75 is located substantially centrally between the left and right handle posts 30L and 30R. Thus, the left handle post 30L can be spaced a distance L1 from the leftmost surface of the container 19 of the cassette gas canister 18, while the right handle post 30R can be spaced a distance L1 from the rightmost surface of the container 19. In this manner, the cassette gas canister 18 can be effectively protected by the left and right handle posts 30L and 30R and left and right handle sections 26b and 26c (see FIG. 2).

Thus, even if only the substantial lower half portion 18b (see FIG. 3) of the cassette gas canister 18 is covered with the gas canister cover unit 75 as noted above, the substantial upper half portion 18a can be protected sufficiently by the left and right handle posts 30L and 30R and left and right handle sections 26b and 26c (see FIG. 2).

More specifically, when the liftable column 32 of the handle column 24 is in the upwardly expanded or lifted position, the substantial upper half portion 18a of the cassette gas canister 18 can be protected by the left and right handle posts 30L and 30R, as shown in FIG. 2. When the liftable column 32 of the handle column 24 is in the contracted position, on the other hand, the substantial upper half portion 18*a* of the cassette gas canister 18 can be protected by the left and right handle sections 26*b* and 26*c*, as shown in FIG. 3.

FIG. 8 is a sectional view showing the cassette gas canister 18 attached to, retained by and accommodated in the gas canister retainer assembly 25. The cassette gas canister 18 is mounted to the adaptor 121 in such a manner that the horizontal tube portion 84*b* of the substantially-L-shaped feed tube 84 is oriented rearward. In the instant embodiment, the adaptor 121 is fixed with a rearward and downward inclination, as noted above. Thus, the cassette gas canister 18 mounted to the adaptor 121 inclines upwardly toward the rear of the machine body, and the horizontal tube portion 84*b* inclines donwardly.

In the aforementioned manner, the inlet portion 84*c* of the horizontal tube portion 84*b* can be located at a low position, i.e. close to a lowermost interior region of the gas canister 18 attached to the retainer assembly 25 in the upside-down posture, so that, even when the remaining amount of the liquid fuel gas 85 stored in the container 19 has decreased considerably, the fuel gas 85 can be efficiently led from the inlet portion 84*c* to the nozzle 83. Thus, the instant embodiment allows the fuel gas 85 to be used up, thereby achieving efficient use of the fuel gas 85.

Figure 9:
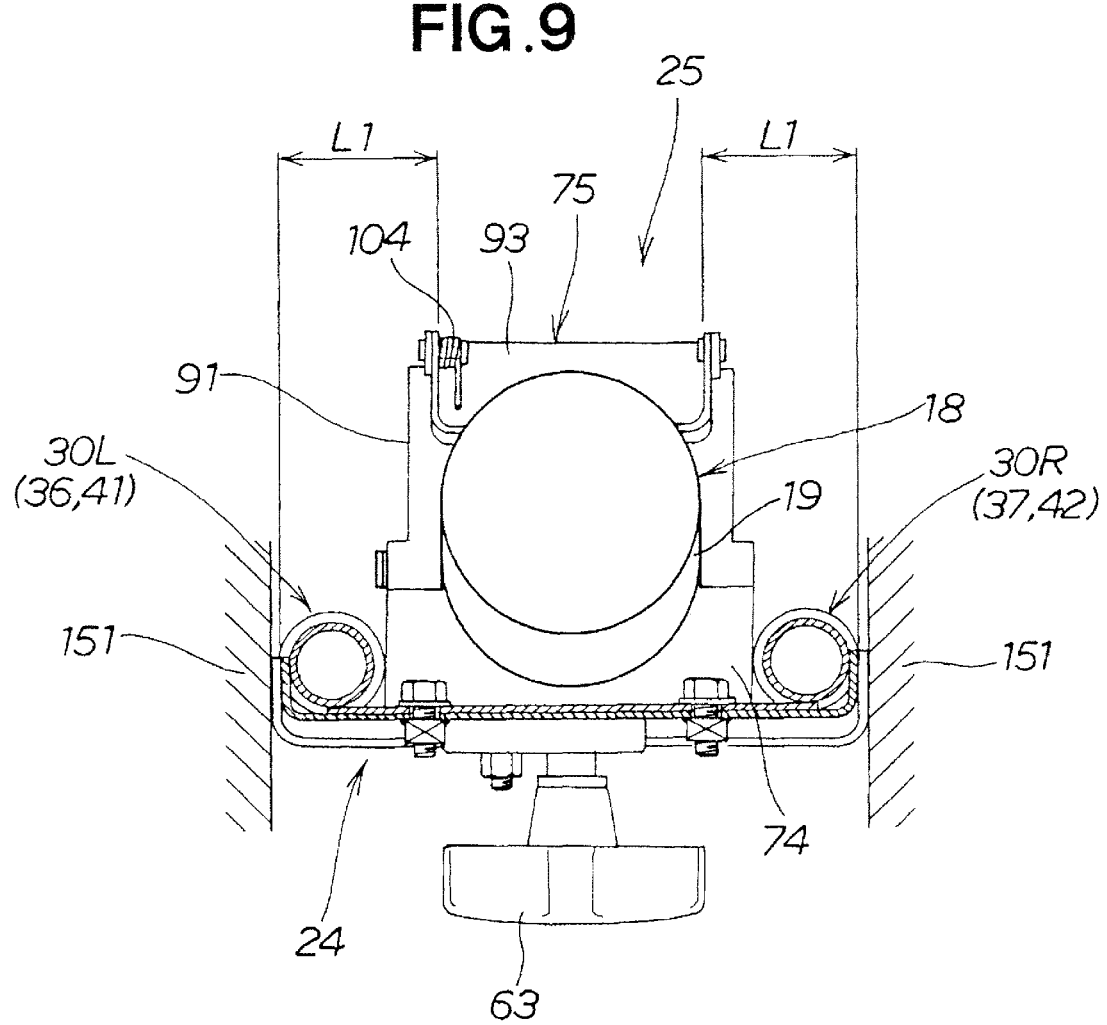
FIG. 9 is a view explanatory of how the cassette gas canister is protected by a handle column.

Next, with primary reference to FIG. 9, a more detailed description will be given about an example manner in which the cassette gas canister 18 is protected by the handle column 24 (more specifically, by the left and right fixed post sections 36 and 37). The cassette gas canister 18 is disposed between the left and right handle posts 30L and 30R with the distance L1 from each of the handle posts 30L and 30R.

Thus, when some obstacle 151 exists to the left of the handle column 24, the left handle post 30L can protect the gas canister 18 from the obstacle 151. Similarly, when some obstacle 151 exists to the right of the handle column 24, the right handle post 30R can protect the gas canister 18 from the obstacle 151.

Because the cassette gas canister 18 can be protected from ambient objects by the left and right handle posts, the gas canister cover unit 75 accommodating the cassette gas canister 18 need not have a very high rigidity, and thus, the gas canister cover unit 75 can be significantly simplified in construction and reduced in size.

Next, with primary reference to FIGS. 10-12, a more detailed description will be given about an example manner in which the cassette gas canister 18 is attached to, retained by and accommodated in the gas canister retainer assembly 25.

Figure 10A:
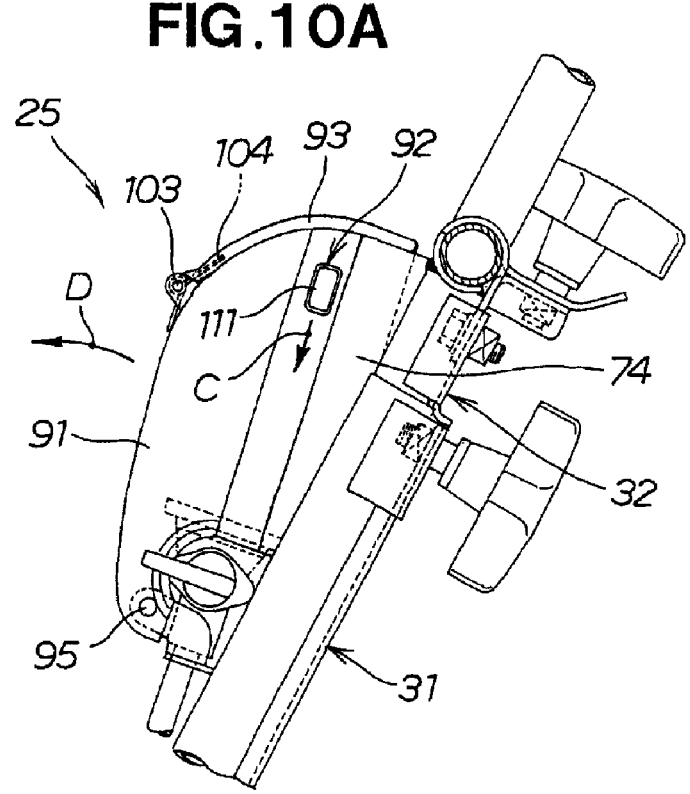
FIGS. 10A and 10B are views explanatory of how the gas canister retainer assembly is opened.
Figure 10B:
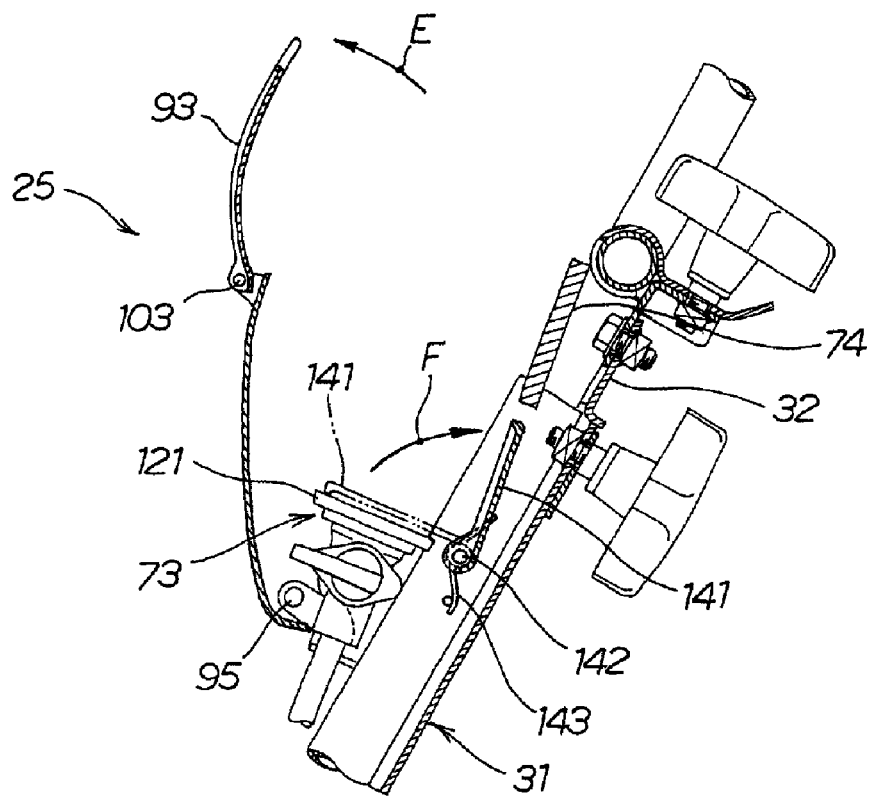

FIGS. 10A and 10B show how the gas canister retainer assembly 25 is opened. As the slide knob 111 is moved downward by the human operator as indicated by arrow C in FIG. 10A, the engaging claw 115 of the engaging lever 112 shown in FIG. 5 disengages from the engaging block 114, so that the locking by the lock mechanism 92 is canceled. In this condition, the main cover member 91 is caused to pivot open about the left and right support pins 95 as indicated by arrow D.

Then, with the main cover member 91 kept in the opened position, the sub cover member 93 is caused to pivot open about the left and right support pins 103, as indicated by arrow E, against the biasing force of the coil spring 104 (see FIG. 10A). Further, the shutter member 141 is caused to pivot open about the support shaft 142, as indicated by arrow F, against the biasing force of the coil spring 143.

Figure 11:
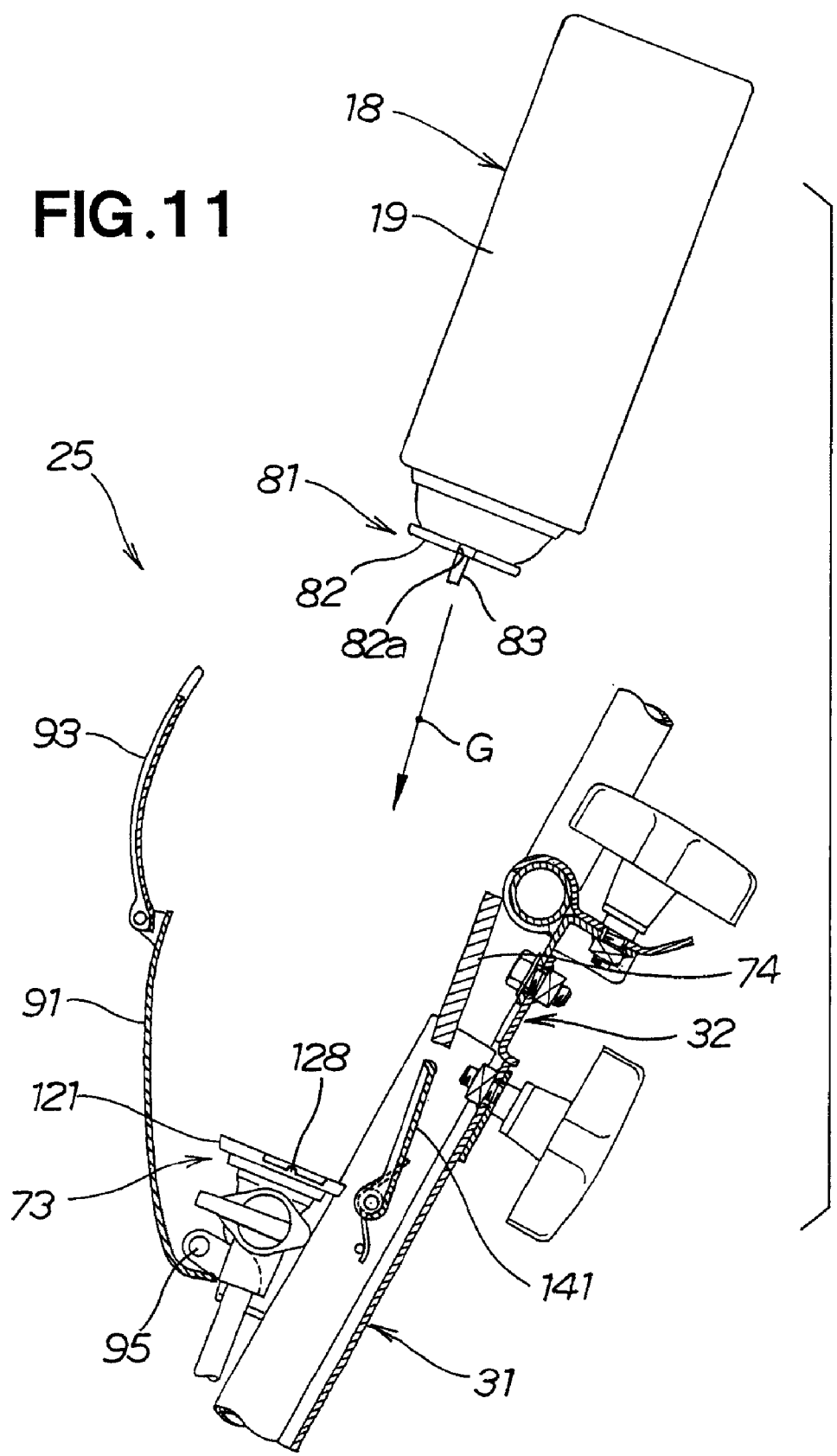
FIG. 11 is a view explanatory of how the cassette gas canister is moved toward the gas canister cover unit for attachment thereto.

FIG. 11 shows how the cassette gas canister 18 is moved toward the gas canister cover unit 75. Namely, the cassette gas canister 18 is first oriented upside down so that the nozzle-side end portion 81 is oriented downward, and the nozzle 83 and recessed portion 82*a* of the cassette gas canister 18 are positioned in alignment with the central receiving opening 131 and radially-inwardly-bent engaging piece 128, respectively, of the adaptor 121. In this condition, the cassette gas canister 18 is moved downward toward as indicated by arrow G.

Figure 12A:
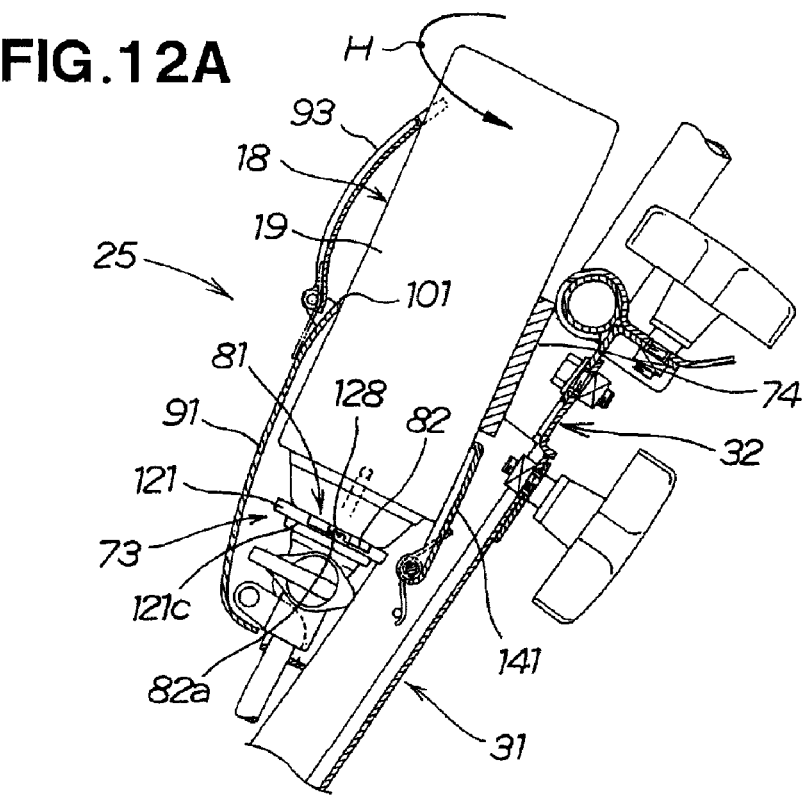
FIGS. 12A and 12B are views explanatory of an example manner in which the cassette gas canister is attached to the gas canister cover unit.
Figure 12B:
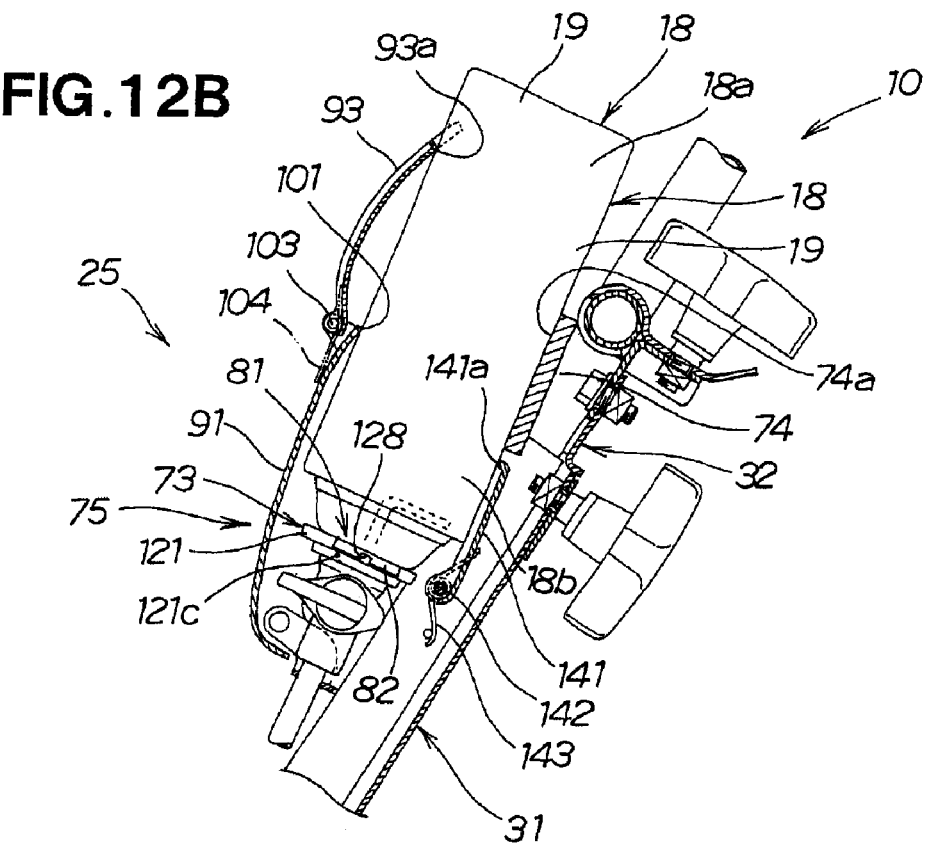

FIGS. 12A and 12B show an example manner in which the cassette gas canister 18 is attached to, retained by and accommodated in the gas canister retainer assembly 25. Namely, as shown in FIG. 12A, the right side portion of the flange 82 is inserted between the bottom 121*c* of the adaptor 121 and the engaging pin 122, during which time the recessed portion 82*a* moves past the radially-inwardly-bent engaging portion 128 without being interfered with the engaging portion 128. As a consequence, the nozzle-side end portion 81 (more specifically, flange 82) can be abutted against the bottom 121*c* of the adaptor 121. As the nozzle-side end portion 81 is abutted against the bottom 121*c* of the adaptor 121 in the aforementioned manner, the upwardly-bulging portion 123*a* of the leaf spring 123 is depressed down to the bottom 121*c* of the adaptor 121. In this condition, the cassette gas canister 18 is caused to pivot in the counterclockwise direction as indicated by arrow H.

Then, as the cassette gas canister 18 is pivoted in the counter-clockwise direction by indicated by arrow H, the recessed portion 82*a* is displaced out of the vertical alignment with the radially-inwardly-bent engaging portion 128, as shown in FIG. 12B. Thus, the left side portion of the flange 82 is sandwiched between the bottom 121*c* and the bent engaging portion 128.

Then, as the cassette gas canister 18 is further pivoted through about 90 degrees in the counterclockwise direction, the recessed portion 82*a* moves to the upwardly-bulging portion 123*a* of the leaf spring 123. Thus, the depressing force applied from the flange 82 to the upwardly-bulging portion 123*a* is canceled, so that the bulging portion 123*a* comes to engage with the recessed portion 82*a*. In the aforementioned manner, the cassette gas canister 18 can be attached to the adaptor 121 with its position appropriately determined by the leaf spring 123.

Then, the main cover member 91 is closed, so that the opening portion 101 of the main cover member 91 comes to abut against the container 19 of the cassette gas canister 18. Further, the sub cover member 93 is closed by the biasing force of the coil spring 104, so that the upper end portion 93*a* of the sub cover member 93 comes to abut against the container 19 of the cassette gas canister 18. Further, the distal end portion 141*a* of the shutter member 141 comes to abut against the container 19 by the biasing force of the coil spring 143. Thus, the instant embodiment can effectively prevent vibrations of the cassette gas canister 18 that may occur during operation of the gas-engine-mounted working machine 10.

Further, in the instant embodiment, the gas canister retainer assembly 25 is located substantially below the waist of the human operator (not shown) operating the gas-engine-mounted working machine 10. Thus, the human operator can attach the cassette gas canister 18, in an upside-down posture or orientation (with the nozzle-side end portion 81 oriented downward), to the retainer assembly 25 (gas canister cover unit 75) by just pushing the gas canister 18 into the cover unit 75.

When the cassette gas canister 18 is to be detached from the gas canister retainer assembly 25, the human operator only has to pull the cassette gas canister 18 upward. Therefore, the instant embodiment can facilitate the attachment and detachment of the cassette gas canister 18 to and from the gas canister retainer assembly 25.

In addition, the gas-engine-mounted working machine 10 is constructed in such a manner that only the substantial lower half portion 18b of the gas canister 18 is covered with the gas canister cover unit 75. With the substantial upper half portion 18a of the gas canister 18 projecting upward beyond the cover unit 75, the instant embodiment not only can even further facilitate the attachment and detachment of the cassette gas canister 18, but also allows the human operator to confirm at a glance whether the cassette gas canister 18 is currently attached to, retained by and accommodated in the gas canister retainer assembly 25.

Whereas the preferred embodiment has been described above in relation to the case where only the substantial lower half portion 18b of the gas canister 18 is covered with the gas canister cover unit 75, the present invention is not so limited. For example, the whole of the cassette gas canister 18 may be covered with the gas canister cover unit 75.

Further, whereas the preferred embodiment has been described above in relation to the case where the leaf spring 123 is employed as the positioning means for appropriately positioning the gas canister 18 in place, the present invention is not so limited. For example, the positioning means may comprise an expandable/contractable positioning pin.

Furthermore, whereas the preferred embodiment has been described above in relation to the case where the handle column is vertically expandable and contractable, the present invention is not so limited. For example, the handle column may be constructed so as not to expand and contract vertically.

The present invention is well suited for application to gas-engine-mounted working machines including a handle column extending rearwardly and upwardly from the machine body and an operating handle attached to the handle column.

Obviously, various minor changes and modifications of the present invention are possible in light of the above teaching. It is therefore to be understood that within the scope of the appended claims the invention may be practiced otherwise than as specifically described.

What is claimed is:

1. A gas-engine-mounted working machine comprising:
   a gas engine mounted on a machine body and supplied with fuel gas from a cassette gas canister;
   gas canister retainer means including a gas canister cover unit and an adapter unit having a nozzle receiving opening, an outlet port of the cassette gas canister being inserted into the nozzle receiving opening to attach the cassette gas canister to said gas canister retainer means,
   wherein a pivotable shutter member biasably engages the cassette gas canister when the cassette gas canister is attached to the nozzle receiving opening, and
   wherein the pivotable shutter member biasably closes the nozzle receiving opening when the cassette gas canister is detached from the nozzle receiving opening; and
   a handle column extending rearwardly and upwardly from the machine body and including left and right handle posts fixed to the machine body for supporting an operating handle of the machine, said left and right handle posts having a forward facing surface which faces said gas engine,
   wherein the cassette gas canister is located, via said gas canister retainer means, between said forward facing surface of said left and right handle posts and said gas engine.

2. The gas-engine-mounted working machine of claim 1, wherein the cassette gas canister is attached to said gas canister retainer means in an upside-down orientation with a gas outlet port of the cassette gas canister oriented downward.

3. The gas-engine-mounted working machine of claim 2, wherein the cassette gas canister has a lead tube of a generally L shape provided therein for leading the fuel gas to the gas outlet port, and said gas canister retainer means includes a positioning means for, when the cassette gas canister is to be attached to said gas canister retainer means, positioning the cassette gas canister in such a manner that an inlet portion of the lead tube, provided for leading the fuel gas into the lead tube, is located close to a lowermost interior region of the cassette gas canister attached to said gas canister retainer means in the upside-down orientation.

4. The gas-engine-mounted working machine of claim 3, wherein said positioning means comprises a leaf spring.

5. The gas-engine-mounted working machine of claim 1, wherein the cassette gas canister has a substantial lower half portion covered with the gas canister cover unit.

6. A gas-engine-mounted working machine comprising:
   a gas engine mounted on a machine body and supplied with fuel gas from a cassette gas canister;
   gas canister retainer means including a gas canister cover unit and an adapter unit having a nozzle receiving opening, the cassette gas canister being attached to said gas canister retainer means; and
   a handle column extending rearwardly and upwardly from the machine body and including left and right handle posts fixed to the machine body for supporting an operating handle of the machine,
   wherein the cassette gas canister is mounted, via said gas canister retainer means, between said left and right handle posts, the cassette gas canister being attached to said gas canister retainer means in an upside-down orientation with a gas outlet port of the cassette gas canister oriented downward into the nozzle receiving opening of the adapter unit, and the cassette gas canister having a lead tube of a generally L shape provided therein for leading the fuel gas to the gas outlet port, and said gas canister retainer means includes a positioning means for, when the cassette gas canister is to be attached to said gas canister retainer means, positioning the cassette gas canister in such a manner that an inlet portion of the lead tube, provided for leading the fuel gas into the lead tube, is located close to a lowermost interior region of the cassette gas canister attached to said gas canister retainer means in the upside-down orientation,
   wherein a pivotable shutter member biasably engages the cassette gas canister when the cassette gas canister is attached to the nozzle receiving opening, and
   wherein the pivotable shutter member biasably closes the nozzle receiving opening when the cassette gas canister is detached from the nozzle receiving opening.

7. The gas-engine-mounted working machine of claim 6, wherein said positioning means comprises a leaf spring.

8. The gas-engine-mounted working machine of claim 6, wherein the cassette gas canister has a substantial lower half portion covered with the gas canister cover unit.

* * * * *